(12) United States Patent
Fikani

(10) Patent No.: US 6,533,571 B2
(45) Date of Patent: Mar. 18, 2003

(54) INJECTION NOZZLE INSULATOR ASSEMBLY

(75) Inventor: Fadi Fikani, Burlington, VT (US)

(73) Assignee: Husky Injection Molding Systems, LTD, Bolton (CA)

( * ) Notice: Subject to any disclaimer, the term of this patent is extended or adjusted under 35 U.S.C. 154(b) by 68 days.

(21) Appl. No.: 09/855,089

(22) Filed: May 14, 2001

(65) Prior Publication Data

US 2001/0033044 A1 Oct. 25, 2001

Related U.S. Application Data

(63) Continuation-in-part of application No. 09/272,251, filed on Mar. 19, 1999, now Pat. No. 6,315,549.

(51) Int. Cl.[7] .............................................. B29C 45/20
(52) U.S. Cl. .................................. 425/549; 264/328.15
(58) Field of Search ................................ 425/549, 562, 425/563, 564, 565, 566; 264/328.15

(56) References Cited

U.S. PATENT DOCUMENTS 5,879,727 A * 3/1999 Puri ........................... 425/549
6,315,549 B1 * 11/2001 Jenko et al. ................. 425/549
6,428,305 B2 * 8/2002 Jenko ......................... 425/549

* cited by examiner

Primary Examiner—Tim Heitbrink

(57) ABSTRACT

An injection molding nozzle having a nozzle tip insulator assembly affixed thereon comprised of an inner sleeve and an outer sleeve is disclosed. The inner sleeve is preferably made from a metal with relatively low thermal conductivity and the outer sleeve is preferably made from a compressible non-metal material that can withstand typical injection pressures and temperatures.

29 Claims, 3 Drawing Sheets

INJECTION NOZZLE INSULATOR ASSEMBLY

RELATED APPLICATION DATA

This application is a continuation-in-part of application Ser. No. 09/272,251, filed Mar. 19, 1999, now U.S. Pat. No. 6,315,549, and is incorporated herein by reference.

BACKGROUND OF THE INVENTION

1. Field of the Invention

This invention relates to the field of injection molding. More particularly, the invention relates to a tip insulator assembly that attaches to a distal end of an injection nozzle. The tip insulator assembly is held onto the nozzle preferably by a removable retainer means.

2. Summary of the Prior Art

Insulators are used to thermally insulate the heated tip or nozzle of a hot runner nozzle assembly from the surrounding cooled gate insert of a mold cavity. U.S. Pat. No. 4,662,837 to Anderson (incorporated herein by reference) shows such an insulator assembly. The insulative material is typically made of a high temperature resistant, resilient material such as VESPEL (polyimide resin). The insulators occupy space that would otherwise be filled with a resin "bubble", well known in the art. If the resin being processed tends to degrade over time and it is allowed to form the insulating bubble around the tip, the degraded resin eventually is drawn into each part being molded causing unsatisfactory properties and appearance. It is therefore essential that the insulating function of the bubble be performed by some other material other than the resin being processed if it is thermally sensitive or if plastics of differing colors are to be processed and errant color streaks are undesirable.

U.S. Pat. No. 5,208,052 to Schmidt et al. (incorporated herein by reference) shows another insulator construction that surrounds a heated tip of a hot runner nozzle assembly. The insulator is made of titanium and separated from both the tip and cooled gate area by air gaps on either side. The insulator is threaded onto the nozzle housing and retains the tip in the housing by means of the contact area there between. The tip must seal against the bubble wall to prevent resin leaking behind it and occupying the air gap space. Sealing is effected by a seal in combination with deflection of the insulator leg pressing between the tip and the bubble wall. This design has the disadvantage of being relatively costly and titanium is not as effective as a thermal insulator as VESPEL (polyimide resin).

Co-pending U.S. application Ser. No. 09/272,251, filed Mar. 19, 1999, now U.S. Pat. No. 6,315,549, to Jenko et. al, shows a two piece insulator that surrounds the tip. An inner titanium sleeve is surrounded by a rather large outer VESPEL (polyimide resin) sleeve and the assembly is releasably fastened to an injection nozzle. In field testing has revealed that the structural design of the Jenko titanium inner sleeve is less than adequate if large enough preload forces are applied to the nozzle tip. Due to the location and orientation of the shoulder on the inner sleeve of the Jenko insulator assembly, a significant amount of the preload is applied to the unsupported shoulder which results in tensile failure of the inner sleeve.

SUMMARY OF THE INVENTION

The primary objective of the present invention is to provide a nozzle tip insulator assembly that may be releasably connected to an injection nozzle and withstand the pressure and temperature associated with injection molding plastics thereby overcoming the drawbacks of the prior art.

Another object of the present invention is to provide a nozzle tip insulator assembly that is comprised of a low profile "Vespel" outer insulator sleeve that is positively retained to an inner titanium sleeve when the mold plates are opened.

Another object of the present invention is to provide a nozzle tip insulator assembly that is comprised of an outer "Vespel" insulator sleeve that is retained in place on an inner titanium sleeve during an injection molding cycle or cycles.

Another object of the present invention is to provide a nozzle tip insulator assembly that uses a smaller amount of expensive "Vespel" to reduce cost and to further reduce the amount of heat transferred out of the nozzle.

Another object of the present invention is to provide a nozzle tip insulator assembly that provides improved structural performance over the prior art.

Another object of the invention is to provide a nozzle tip insulator that acts as the only nozzle seal for an injection nozzle.

A nozzle tip insulator assembly comprises an inner sleeve formed to fit around a nozzle tip, an outer sleeve on the inner sleeve, and a joining means located between the inner and outer sleeves. A shoulder protrudes from the inner sleeve to restrain the movement of the outer sleeve. The shoulder is located to direct a portion of loads applied to the outer sleeve into the nozzle tip, thereby reducing tensile loads in the inner sleeve. The inner sleeve is preferably releasably affixed to an injection nozzle. The outer sleeve is preferably made of a material with a low thermal conductivity, such as VESPEL (polyimide resin).

Further objects and advantages of the present invention will appear hereinbelow.

DETAILED DESCRIPTION OF THE PREFERRED EMBODIMENTS

Figure 1:
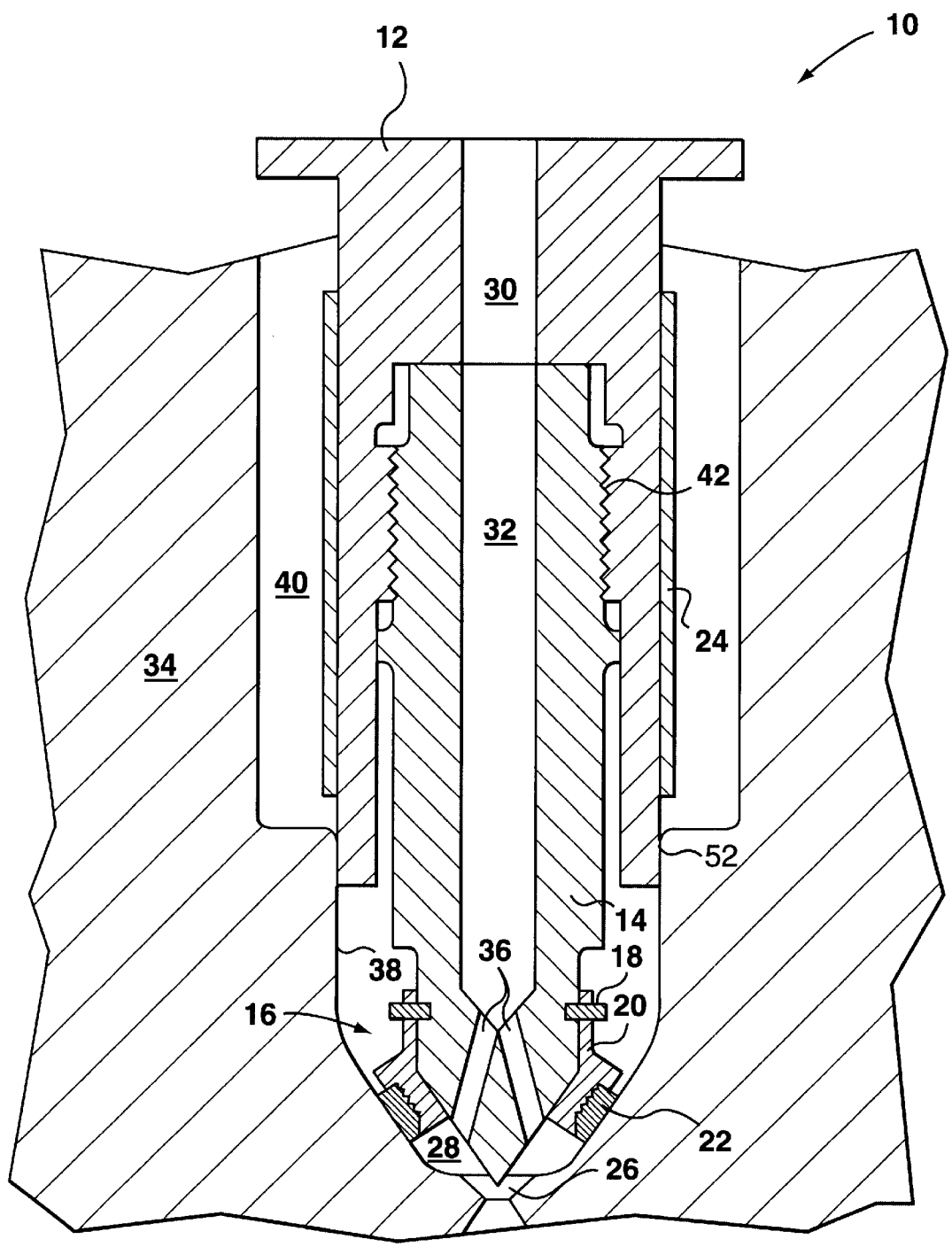
FIG. 1 is a simplified cross-sectional view of an injection nozzle in accordance with one exemplicative embodiment of the present invention.

Referring first to FIG. 1, which shows a simplified cross-section of an injection nozzle assembly 10 in accordance with an exemplicative embodiment of the present invention. The nozzle assembly 10 is inserted in a cavity 40 in a mold plate 34 as well known in the art. Nozzle assembly 10 is comprised of an elongated nozzle bushing 12 having an internal first melt channel 30 therein for receipt of a fluid from a hot runner manifold (not shown) or the like. A heater 24 is placed in thermal communication with the nozzle bushing 12 for maintaining the elevated temperature of the nozzle 10. Affixed coaxially to nozzle bushing 12 is an elongated nozzle tip 14 with a second melt channel 32 formed therein and placed in alignment with first melt channel 30. Fluid entering first melt channel 30 is further communicated to second melt channel 32 and is then communicated to one or more third melt channels 36 at the lower distal end of the nozzle tip 14.

In this embodiment, and not by limitation, the nozzle tip 14 is affixed to nozzle bushing 12 by an attachment means 42, ie. threads. Alternative attachment methods could easily be employed by someone with ordinary skill in the art, and such alternatives are fully contemplated herein.

A tip insulator assembly 16 is affixed to the lower distal end of the nozzle tip 14 adjacent a mold gate 26. In one preferred embodiment, the assembly 16 is releasably attached by a retainer means 18, such as a spring clip. The tip insulator assembly 16 is comprised of an inner sleeve 20 made from a material with a relatively low thermal conductivity, such as titanium. The inner sleeve 16 is generally a hollow cylindrically shaped body adapted to sealingly fit around the lower distal end of the nozzle tip 14 as shown in the figure.

An outer sleeve 22, also made from a material with a relatively low coefficient of thermal conductivity, is affixed to an outer surface of the inner sleeve 20 such that an outer surface of the outer sleeve 22 sealingly abuts against a gate wall 38 during an injection molding cycle. In one embodiment, the outer sleeve is made from VESPEL (polyimide resin). With this sealing arrangement, molten fluid is communicated from the space denoted by FIG. 28 to the gate 26, thereby not allowing material to become stagnate for an extended period of time and degrade.

Figure 2:
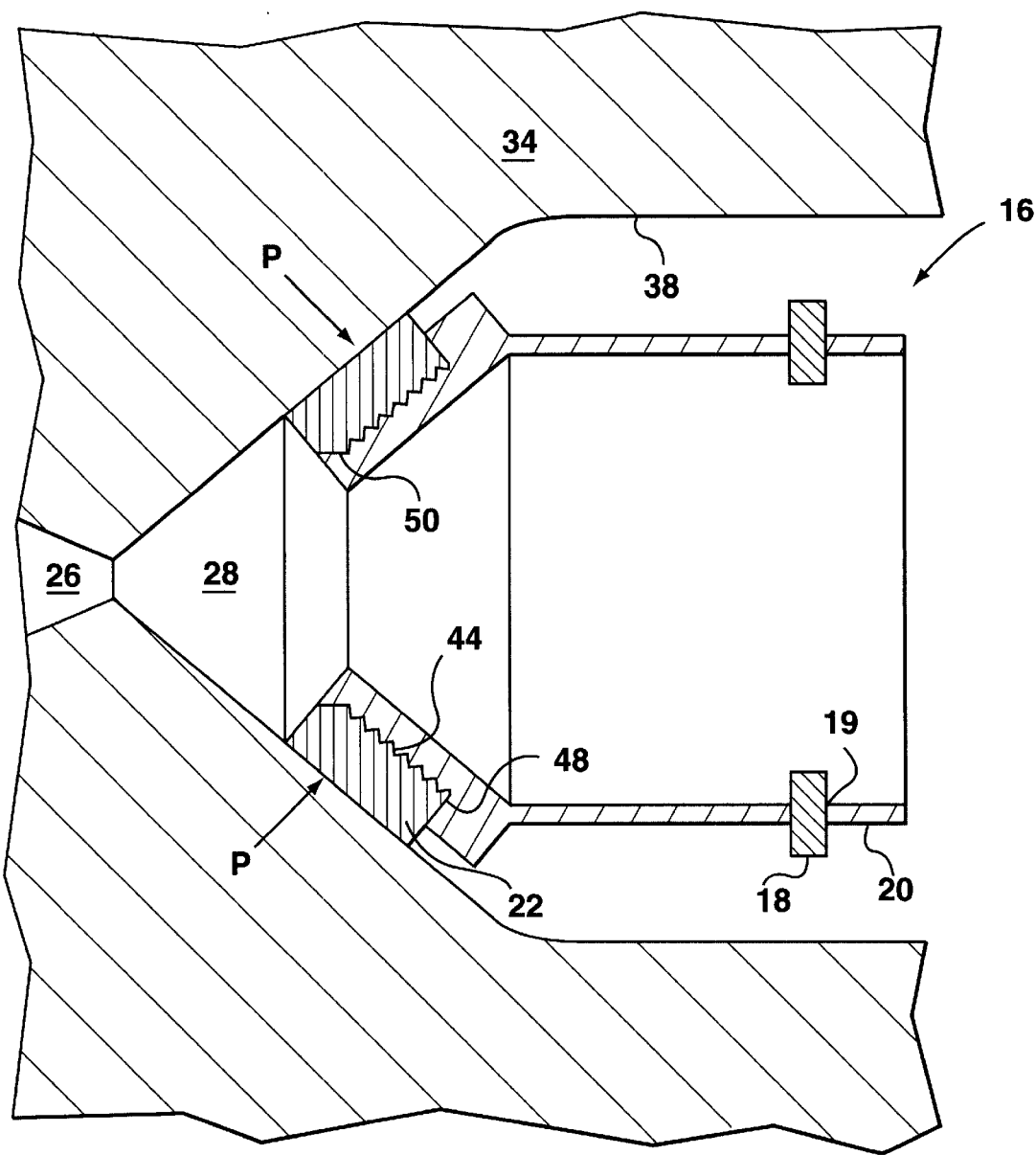
FIG. 2 is an enlarged cross-sectional view of one exemplicative embodiment in accordance with the present invention.
Figure 3:
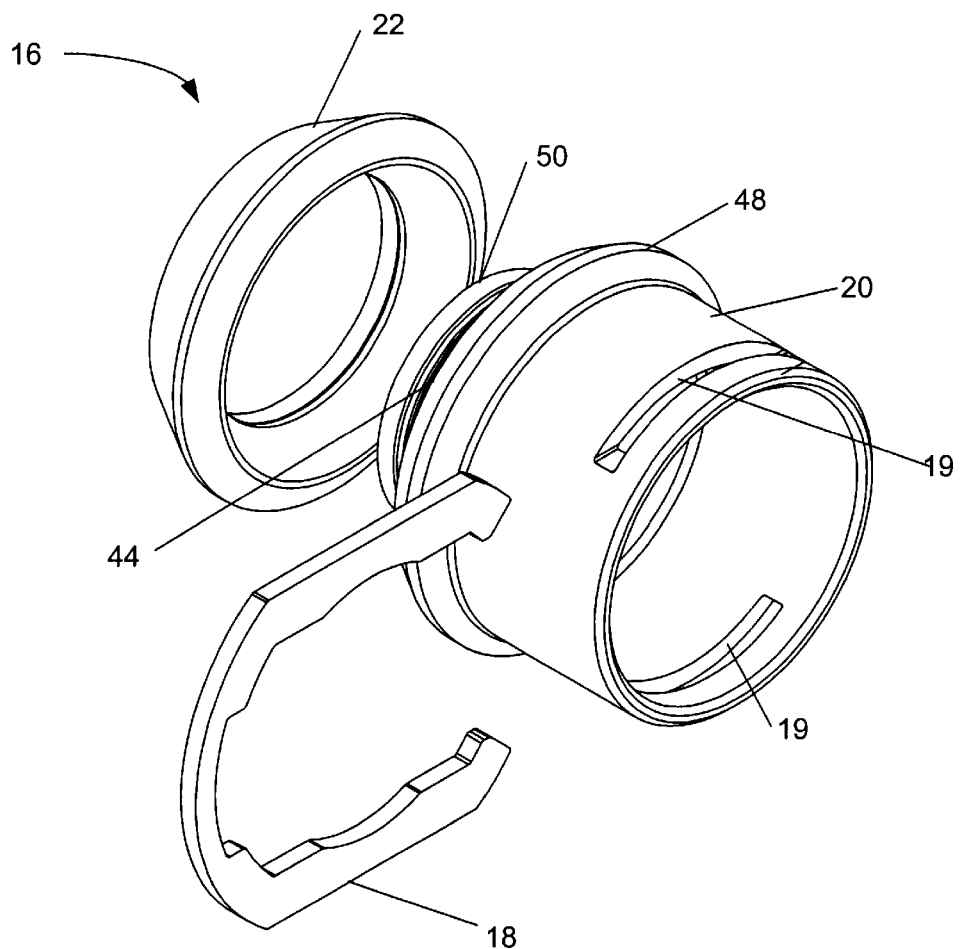
FIG. 3 is an exploded isometric view of an exemplicative embodiment in accordance with the present invention.

Referring now to FIGS. 2 and 3, where like features have like numerals, enlarged views of the tip insulator assembly 16 is shown. The outer sleeve 22 is affixed to and protrudes from the inner sleeve 20. A shoulder 48 located on the inner sleeve 20 is provided to prevent the sealing pressure (denoted P) from forcing the outer sleeve 22 off the inner sleeve 20 during an injection cycle.

To prevent the outer sleeve 22 from falling off the inner sleeve 22 when the gate wall 36 is removed, a joining means 44 is provided between the inner sleeve 20 and the outer sleeve 22. The joining means 44 would preferably be formed on the outer surface of the inner piece 20 and could be a series of circumferential ridges, an external thread, an array of through holes or protrusions or the like. In the embodiment shown in FIGS. 2 and 3, a series of circumferential ridges are used. The exact configuration of the joining means 44 could be easily modified as long as it allows the outer sleeve 22 to remain affixed to the inner sleeve 20.

In the preferred embodiment, the outer sleeve 22 is allowed to deform under the pressure (denoted P) created during the initial heat up the nozzle assembly into the joining means 44 such that when the injection cycle operating temperature is reached, the outer sleeve 22 is mechanically retained on the inner sleeve 20. As the nozzle assembly 10 is heated up from room temperature to the molding process temperature, the overall length of the nozzle assembly 10 will grow and bring the outer sleeve 22 into sealing contact with the gate wall 38. The amount of thermal growth of a given nozzle assembly 10 is well known in the art and provides the sealing force between the gate wall 38 and the outer sleeve 22 and causes deformation of the outer sleeve 22 and joins the outer sleeve 20 to the inner sleeve 20. Alternatively, the nozzle assembly could already be in contact with the gate wall at room temperature, but as the nozzle assembly is heated up, the preload on the outer sleeve increases to provide a more positive seal.

Located at the distal end of the inner sleeve 20 adjacent space 28 is an angled protrusion 50. This wedge like protrusion 50 interfaces with the outer sleeve 22 to form a highly efficient sealing interface to prevent the high-pressure molten fluid from migrating between the inner and outer sleeves.

In one preferred embodiment, at least one slot 19 is provided through a wall of the inner piece 20 for insertion of the retainer means 18. The slot 19 aligns with a complimentary slot in the nozzle tip 14 for insertion of the retainer means 18. In this manner, tip insulator assembly 16 is releasably attached to the nozzle tip 14. Alternative arrangements of the retainer means 18 could easily be provided, for example, threads, snap in detents, a pin and hole arrangement to name just a few. Although it is preferably to have the tip insulator assembly 16 releasably attached to the nozzle tip 14, it could also be permanently affixed by brazing, press fitting on the nozzle tip, welding or the like.

In one preferred embodiment, the size of outer sleeve 22 has been substantially reduced due to the use of the shoulder 48 and the joining means 44 on the inner sleeve 20. Since a preferred embodiment of the outer sleeve 22 uses the expensive "Vespel" material due to its compressibility, low coefficient of thermal conductivity and ability to withstand high temperatures, reducing the size of the outer sleeve 22 substantially reduces the cost to produce the tip insulator assembly. Further still, by reducing the size of the outer sleeve 22, the amount of heat conducted out of the nozzle tip 14 has been reduced which results in better performance of the injection molding process.

Placement of the shoulder 48 is such that the preload force P is supported by both the protruding shoulder 48 and the nozzle tip 14. This arrangement reduces the tensile forces in the outer sleeve 22 and eliminates the possibility of structural failure of the outer sleeve 22.

As a result of the improved structural performance of the nozzle insulator assembly 16, back up sealing interfaces 52 (FIG. 1) that were provided between the nozzle bushing 12 and the mold plate 34 in the prior art have been eliminated. As a result, machining tolerances and heat loss between these two components have been improved.

It is to be understood that in the context of the present invention, the term nozzle or nozzle tip may be used interchangeably, and may refer to either of a nozzle tip for a hot runner application, or a nozzle tip on the end of an injection molding machine's injection unit that is coupled to a mold sprue bushing. Insulator assemblies that can be attached to either type of injection molding nozzle tip are considered useful and within the scope of the present invention, which should not be limited to one application or the other.

It is to be further understood that the present invention should not be limited only to the use of hot runner nozzles with molds. The present invention includes the use of hot runner nozzles that are installed as extensions between machine injection units and inlets to mold hot runners, which are outside the mold structure. The hot runner nozzle tip may form a connection between hot runner structures, or between an injection machine nozzle and a heating channel for conveying melted materials. Insulators that can be removably attached to hot runner nozzle tips used in any setting are considered useful and within the scope of the present invention, which should not be limited to the use of hot runner nozzles with molds.

It is to be understood that the invention is not limited to the illustrations described herein, which are deemed to illustrate the best modes of carrying out the invention, and which are susceptible to modification of form, size, arrangement of parts and details of operation. For example, the releasable retainer means 18 has many easily identifiable equivalents. The invention is intended to encompass all such modifications, which are within its spirit and scope as defined by the claims.

What is claimed is:

1. An injection molding system having a fluid source in communication with at least one injection molding nozzle assembly inserted in a mold plate, said injection molding nozzle assembly comprising;
   a nozzle bushing having a first melt channel formed therein, said first melt channel in fluid communication with said fluid source,
   a nozzle tip having a second melt channel formed therein, said second melt channel in fluid communication with said first melt channel and a mold gate,
   a nozzle tip insulator assembly affixed adjacent said mold gate to said nozzle tip, said nozzle tip insulator assembly in sealing abutment with a gate wall and comprising;
      an inner sleeve in thermal communication with said nozzle tip,
      an outer sleeve affixed to said inner sleeve by a joining means located between said inner and outer sleeve,
      a shoulder protruding from said inner sleeve to restrain the movement of said outer sleeve, said shoulder located on said inner sleeve to direct a portion of loads applied to said outer sleeve into said nozzle tip thereby reducing tensile loads in said inner sleeve.

2. The injection molding system of claim 1, wherein said nozzle tip insulator assembly is releasably attached to said nozzle tip by a retaining means.

3. The injection molding system of claim 2, wherein said retaining means is comprised of a clip inserted into at least one slot in said nozzle tip insulator assembly and a complimentary slot in said nozzle tip.

4. The injection molding system of claim 3, wherein said at least one slot is located in said inner piece.

5. The injection molding system of claim 2, wherein said retaining means is comprised of one selected from the group consisting of threads, snap detent, bayonet type connection, pin, brazing, welding, press fit and gluing.

6. The injection molding system of claim 1, further comprising a heater in thermal communication with said injection molding nozzle.

7. The injection molding system of claim 1, further comprising a releasable attachment means between said nozzle bushing and said nozzle tip.

8. The injection molding system of claim 7, wherein said attachment means is one selected from the group consisting of threads, snap detent, bayonet type connection, pin, press fit and gluing.

9. The injection molding system of claim 1, further comprising at least one third melt channel formed in said nozzle tip in fluid communication with said second melt channel and said mold gate.

10. The injection molding system of claim 1 wherein said nozzle tip is made from a material having a high thermal conductivity.

11. The injection molding system of claim 1 wherein said nozzle tip is made from a copper alloy.

12. The injection molding system of claim 1 wherein said inner sleeve is made from a material having a low thermal conductivity.

13. The injection molding of claim 1 wherein said inner sleeve is made from a titanium alloy.

14. The injection molding of claim 1 wherein said outer sleeve is made from a material having a low thermal conductivity.

15. The injection molding system of claim 1 wherein said outer sleeve is made from a resilient material to be in sealing communication with said gate wall.

16. The injection molding system of claim 1 wherein said outer sleeve is made from a resilient, heat resistant material.

17. The injection molding system of claim 1 wherein said outer sleeve is made from a non-metal.

18. The injection molding system of claim 17 wherein said non-metal is one selected from the group consisting of thermoplastics, polyimides, fluoropolymers, ceramics, thermosets, polybenzimidazole and silicone.

19. The injection molding system of claim 1, wherein said joining means is one selected from the group consisting of at least one ridge, thread, hole, pocket, protrusion and serration.

20. The injection system of claim 1, wherein said shoulder does not contact said gate wall.

21. The injection molding system of claim 1, further comprising a protrusion extending from an outer surface of said inner sleeve into said outer sleeve adjacent said mold gate.

22. The injection molding system of claim 21 wherein said protrusion is wedged shaped and provides a sealing force between said inner piece and said outer piece.

23. The injection molding system of claim 1 wherein said nozzle tip insulator assembly is the only seal provided between said nozzle and said mold plate.

24. A nozzle tip insulator assembly comprising:
   an inner sleeve formed to fit around a nozzle tip,
   an outer sleeve provided on said inner sleeve and a joining means located between said inner and outer sleeve,
   a shoulder protruding from said inner sleeve to restrain the movement of said outer sleeve, said shoulder located to direct a portion of loads applied to said outer sleeve into said nozzle tip thereby reducing tensile loads in said inner sleeve.

25. The nozzle tip insulator assembly of claim 24, wherein said nozzle tip insulator assembly is releasably attached to said nozzle tip by a retaining means.

26. The nozzle tip insulator assembly of claim 25, wherein said retaining means is comprised of at least one clip inserted into at least one slot in said nozzle tip insulator assembly and a complimentary slot in said nozzle tip.

27. The nozzle tip insulator assembly of claim 26, wherein said at least one slot is located in said inner piece.

28. The nozzle tip insulator assembly of claim 25, wherein said retaining means is comprised of one selected from the group consisting of threads, snap detent, bayonet type connection, pin, brazing, welding, press fit and gluing.

29. An injection molding device for communication of a fluid to a mold comprising:
   a nozzle assembly in fluid communication with said mold, said nozzle assembly comprising:
      a nozzle tip through which said fluid passes; and
      a nozzle tip insulator assembly for thermally insulating said nozzle tip, said nozzle tip insulator assembly comprising:
         an inner sleeve formed to fit around said nozzle tip,
         an outer sleeve provided on said inner sleeve and a joining means located between said inner and outer sleeve,
         a shoulder protruding from said inner sleeve to restrain the movement of said outer sleeve, said shoulder located to direct a portion of loads applied to said outer sleeve into said nozzle tip thereby reducing tensile loads in said inner sleeve.

* * * * *